(12) United States Patent
Salila Vijayalal Mohan et al.

(10) Patent No.: US 11,585,775 B2
(45) Date of Patent: Feb. 21, 2023

(54) METHOD AND SYSTEM FOR INTEGRITY TESTING OF SACHETS

(71) Applicant: NATIONAL UNIVERSITY OF SINGAPORE, Singapore (SG)

(72) Inventors: Hari Krishna Salila Vijayalal Mohan, Singapore (SG); Voon Yew Aaron Thean, Singapore (SG); Suryakanta Nayak, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 0 days.

(21) Appl. No.: 17/050,916

(22) PCT Filed: Apr. 24, 2019

(86) PCT No.: PCT/SG2019/050227
§ 371 (c)(1),
(2) Date: Oct. 27, 2020

(87) PCT Pub. No.: WO2019/209180
PCT Pub. Date: Oct. 31, 2019

(65) Prior Publication Data
US 2021/0372961 A1 Dec. 2, 2021

(30) Foreign Application Priority Data

Apr. 27, 2018 (SG) .......................... 10201803574Y

(51) Int. Cl.
*G01N 27/24* (2006.01)
*B65B 57/10* (2006.01)
(52) U.S. Cl.
CPC .............. *G01N 27/24* (2013.01); *B65B 57/10* (2013.01)

(58) Field of Classification Search
CPC ........ G01N 27/00; G01N 27/02; G01N 27/04; G01N 27/22; G01N 27/20; G01N 27/24; B65B 57/10
See application file for complete search history.

(56) References Cited

U.S. PATENT DOCUMENTS 5,760,295 A    6/1998  Yasumoto
6,504,387 B1   1/2003  Shail
               (Continued)

FOREIGN PATENT DOCUMENTS

CN    102620897 A    8/2012
JP    2001074586 A   3/2001
               (Continued)

OTHER PUBLICATIONS

A non-destructive technique for detecting pinholes in hermetically sealed flexible packaging; KI Jolic, C R Nagarajah and P Iovenitti; Published under licence by IOP Publishing Ltd; Measurement Science and Technology, vol. 11, No. 9.

(Continued)

*Primary Examiner* — Feba Pothen
(74) *Attorney, Agent, or Firm* — Volpe Koenig

(57) ABSTRACT

A method and system for integrity testing of sachets. The method comprises the steps of disposing at least a portion of the sachet relative to an electrode structure; applying an AC bias voltage to the electrode structure; measuring an electrical property of the portion of the sachet over a frequency range, and determining the integrity based on the measured electrical property over the frequency range.

20 Claims, 16 Drawing Sheets

(56) References Cited

U.S. PATENT DOCUMENTS

| | | | |
|---|---|---|---|
| 7,061,249 | B2 | 6/2006 | Otsuka |
| 7,251,986 | B2 | 8/2007 | Ishida |
| 7,696,890 | B2 | 4/2010 | Bandholz |
| 2005/0151529 | A1 | 7/2005 | Ishida |
| 2010/0018941 | A1* | 1/2010 | Kerr ........................ G01M 3/38 215/250 |
| 2011/0291677 | A1 | 12/2011 | Bodea |

FOREIGN PATENT DOCUMENTS

| | | | |
|---|---|---|---|
| JP | 3313189 | B2 * | 8/2002 |
| JP | 2004069458 | A | 3/2004 |
| JP | 2008195419 | A | 8/2008 |
| JP | 4320862 | B2 * | 8/2009 |
| WO | 2007148361 | A1 | 12/2007 |

OTHER PUBLICATIONS

Food packaging indicators and sensors—2015.
Development of a high-speed sensing and detection system for automatic removal of packages with leaky seals from a high-speed food processing and packaging line—Jul. 2009.
Investigations of Heat Seal Parameters and Oxygen Detection in Flexible—May 2012.
First Office Action issued by China National Intellectual Property Administration (CNIPA) for the corresponding Chinese Patent Application No. 201980028481.8 dated Aug. 25, 2022.

* cited by examiner

METHOD AND SYSTEM FOR INTEGRITY TESTING OF SACHETS

CROSS REFERENCE TO RELATED APPLICATIONS

This application is a national stage entry of International Patent Application No. PCT/SG2019/050227 filed on Apr. 24, 2019 based on Singapore Patent Application No. 10201803574Y filed Apr. 27, 2018, which applications are incorporated by reference herein as fully set forth.

FIELD OF INVENTION

The present invention relates broadly to a method and system for integrity testing of sachets, in particular to a method and system for seal integrity and package integrity testing of sachets.

BACKGROUND

Any mention and/or discussion of prior art throughout the specification should not be considered, in any way, as an admission that this prior art is well known or forms part of common general knowledge in the field.

Quality assurance (QA) in e.g. the food and pharmaceutical industries is the foremost facet that dictates brand integrity and reliability. Flexible packages offer large scalability in terms of mass production and reduced production time to meet consumer demands. Sealing flexible packages is an economical way for manufacturers to retain product quality for maximizing shelf life of both dry and moist contents. Any deviation from an airtight containment will adversely affect the product quality, which is detrimental to the manufacturers (financial loss and negative brand image) and fatal for public health and environment. This has generated tremendous interest in cost effective inspection technologies capable of detecting poor seals, defective seals and inner protective layers in flexible packages.

One popular approach in such industries includes using pressure-based systems to inspect the seals/package quality, but this approach suffers from offline analysis, random sampling, expensive equipment, low throughput and high processing time, which considerably affect the production/packaging cost and time.

Other current methods using vacuum/pressure decay, differential force measurement, bubble test and helium leak detection test suffer from the following drawbacks:
  i. Poor sensitivity towards tiny particles (eg. beverage powder) trapped in sachet seal area. This allows moisture and air to diffuse into the sachet, thus rendering it defective and prone to contamination.
  ii. Such methods require offline screening and are not viable in production/packaging line because of high processing time.
  iii. The existing seal integrity inspection systems have a destructive approach, involve high cost and use heavy equipment with low throughput, which leads to large reject sachets/pouches and more financial loss for waste disposal.
  iv. Complex mode of inspection requiring labor, sampling methods and time consuming with possibility of generating large waste.

Embodiments of the present invention seek to address at least one of the above problems.

SUMMARY

In accordance with a first aspect of the present invention, there is provided a method for integrity testing of sachets, the method comprising the steps of disposing at least a portion of the sachet relative to an electrode structure; applying an AC bias voltage to the electrode structure; measuring an electrical property of the portion of the sachet over a frequency range, and determining the integrity based on the measured electrical property over the frequency range.

In accordance with a second aspect of the present invention, there is provided a system for integrity testing of sachets, the system comprising an electrode structure configured to be disposed relative to at least a portion of a sachet; a source configured to apply an AC bias voltage to the electrode structure; a measurement unit configured to measure an electrical property of the portion of the sachet over a frequency range; and a determination unit configured to facilitate determining the integrity based on the measured electrical property over the frequency range.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention provide a system and method for detecting trapped particles, such as beverage powder, in the seals and/or worn out package layers of sachets and identify damaged sachets electronically using a capacitive seal and package integrity sensor.

One example embodiment provides a seal trapped particle and/or worn out package layer detection system for recognizing the accumulation of beverage powders in the seal of a packet/sachet. The detection setup according to one such embodiment comprises of two copper electrodes in the form of a parallel plate capacitor serving as sensing and reference electrode sandwiching the sachet seal/body area and connected to a frequency response analyzer system, which generates an AC electric field of varying frequencies as the input to the system. The output is monitored, for example, in the form of capacitance in such an embodiment, which is sensitive to accumulation of particles and/or worn out package layer between the two electrodes by interfering with the fringing electric field. For example, as beverage particles collect in-between the seal area the capacitance increases. More generally, any deviation from the ideal sachet seal capacitance can be used to alert a packaging line and, for example, divert the defective samples for replacement or re-sealing. This approach to screen defective seals/inner protective layers according to example embodiment stems from the differential seal/body capacitance in the presence and absence of trapped particles/worn out inner layers. Monitoring the frequency response, for example, the capacitance change can enable classification of good and defective samples in real-time with high throughput to match the sealing/packaging process throughput, according to example embodiments.

Based on the particle size and quantity, and/or types of worn out package layers, for example capacitance fingerprints can be created to quantify the type of defect according to example embodiments.

System Set Up According to an Example Embodiment

Figures 1A, 1B:
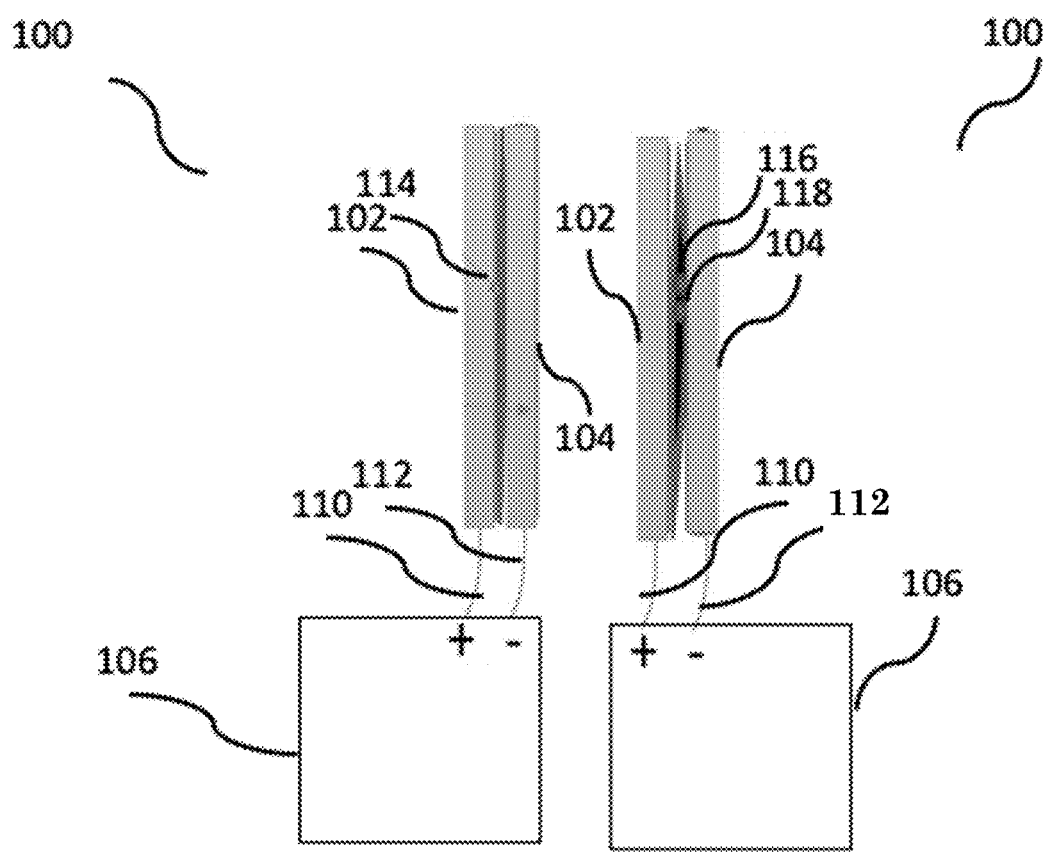
FIG. 1a) shows a schematic diagram of a measurement set up according to an example embodiment, on a well-sealed sample.
FIG. 1b) shows a schematic diagram of a measurement set up according to an example embodiment, on a poorly sealed sample.

The system 100 comprises a pair of substantially planar copper electrodes comprising copper tape 102, 104 on a plastic substrate (not shown), as schematically shown in FIGS. 1a) and b). The sample area of a beverage powder sachet is placed between the copper electrodes 102, 104. Using leads 110, 112 connected to the electrodes 102, 104, a frequency response is measured by scanning, in one example, over a frequency (f) range from 20 Hz to 1 MHz at an AC bias voltage of 1 V to determine the capacitance (C) using a E4980AL LCR meter 106. In the experiments, chocolate and malt powder sachets were used. It is noted that the frequency range and/or bias voltage selection depends on the sample size, type (conducting/insulating), location of seal (one, two or multiple seals) and sample contents (solid/fluid). FIG. 1d) shows a photograph of a prototype plastic substrate clip 109 with copper tape electrodes 111, 113 on each side of the clip 109. The experiments were done for the following cases described below:

i) Well-sealed sample 114, FIG. 1a), and poorly-sealed sample 116, FIG. 1b) with beverage powder e.g. 118 in seal area—to detect compromised seals with trapped beverage powder particles in the sealing area, according to example embodiments.

Figure 1C:
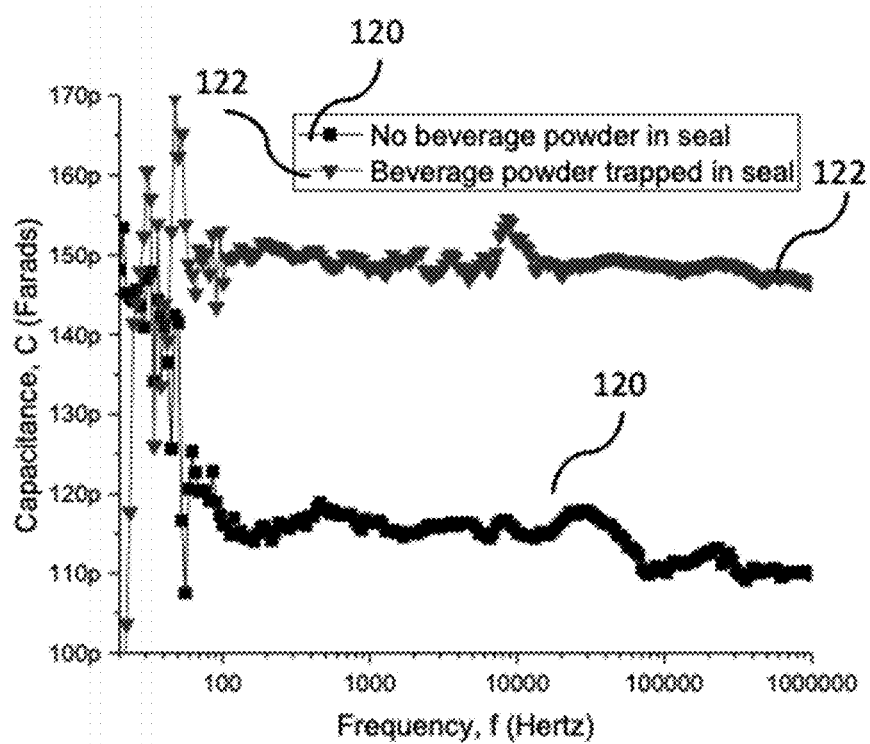
FIG. 1c) shows capacitance (in Farads) vs frequency (in Hertz) scans for the well-sealed sample (no beverage powder) and the poorly sealed sample (with beverage powder), according to an example embodiment.
Figure 1D:
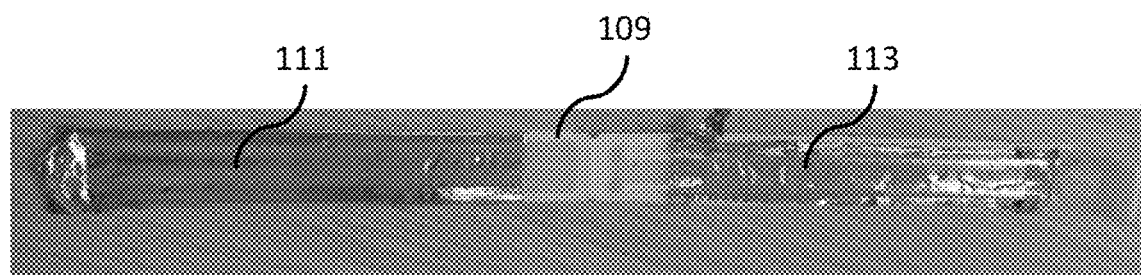
FIG. 1d) shows a photograph of an electrode arrangement to detect defective seals or sachets, according to an example embodiment.

As can be seen in the capacitance vs. frequency scans 120 (sample 114) and 122 (sample 116) shown in FIG. 1c), the scans are readily distinguishable between the respective samples, advantageously enabling identification of poorly-sealed samples compared to well-sealed samples.

ii) Proper inner coating and worn inner coating with beverage powder in sachet—to detect worn out inner coating in sachets, according to example embodiments.

Figures 2A, 2B:
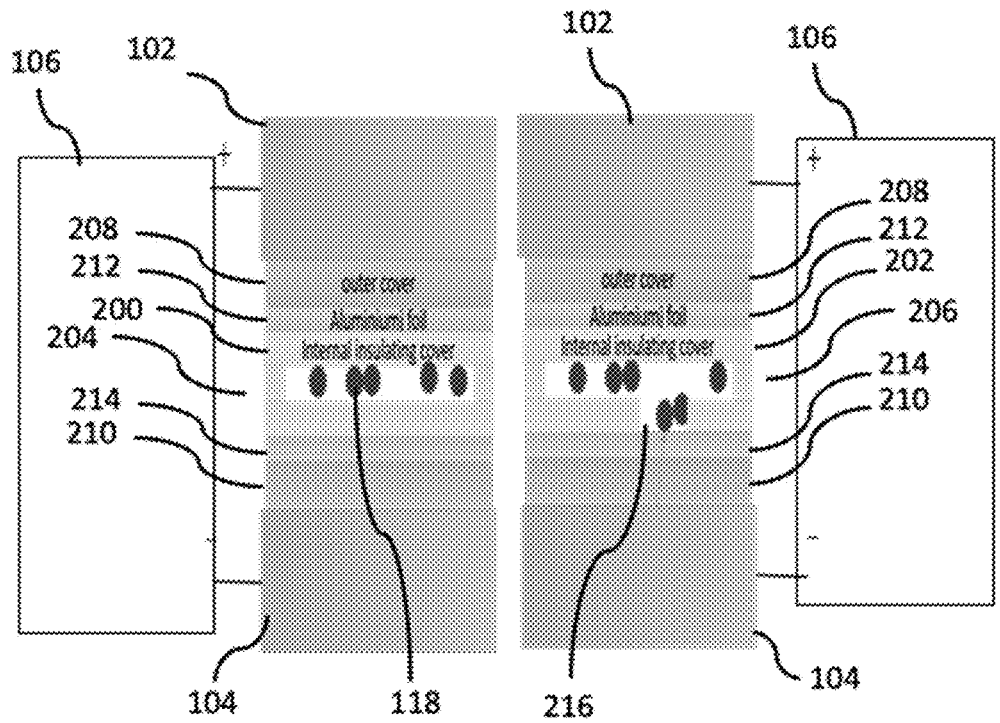
FIG. 2a) shows a schematic diagram of a measurement set up according to an example embodiment, on a good sachet containing beverage powder.
FIG. 2b) shows a schematic diagram of a measurement set up according to an example embodiment, on a defective sachet with inner protective layers worn and containing beverage powder.
Figure 2C:
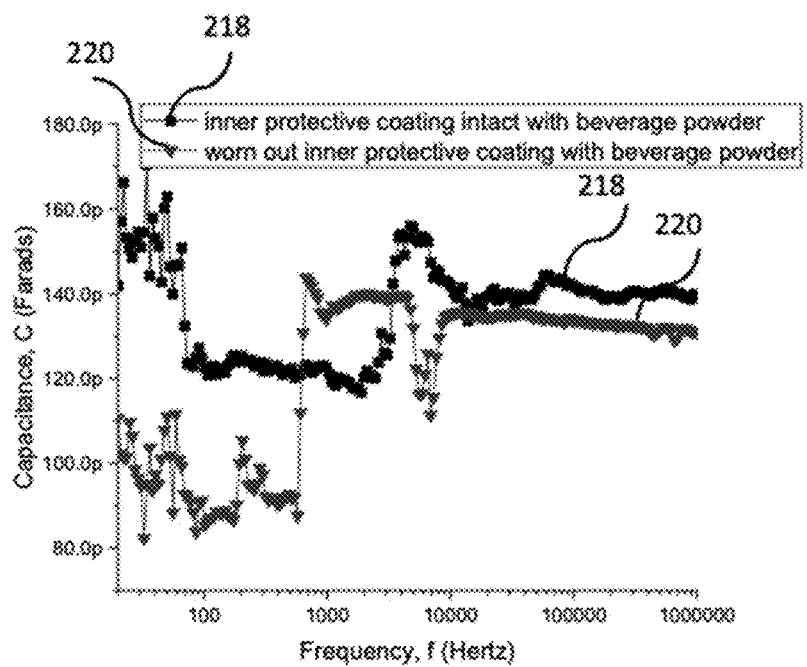
FIG. 2c) shows capacitance (in Farads) vs frequency (in Hertz) scans for the good sachet and the defective sachet, according to an example embodiment.

FIGS. 2a) and b) show the schematic diagrams of the measurement set up according to an example embodiment for good and defective inner insulating cover 200, 202, respectively. More specifically, sachets 204, 206 were sandwiched with their main body between the electrodes 102, 104 on the substrate (compare FIG. 1c)). The sachet 204 has a layered structure comprising outer covers 208, 210, aluminum foil layers 212, 214 and proper inner insulating cover 200. The sachet 206 has a layered structure comprising the outer covers 208, 210, the aluminum foil layers 212, 214 but a worn inner insulating cover 202, as illustrated by gap 216 in FIG. 2b). Beverage powder e.g. 118 is present in the sachets 204, 206. FIG. 2c) shows the capacitance (in Farads) vs frequency (in Hertz) scans 218, 220 for good sachet 204 and defective sachet 206 (with inner insulating cover 202 worn. Both sachets 204, 206 contain beverage powder 222).

As can be seen in the capacitance vs. frequency scans 218 (sachet 204) and 220 (sachet 206), the scans are readily distinguishable between the respective samples, advantageously enabling identification of worn inner coating compared to proper inner coating sachets.

In the following, further experiments according to example embodiments will be described.

iii) Control

Figure 3A:
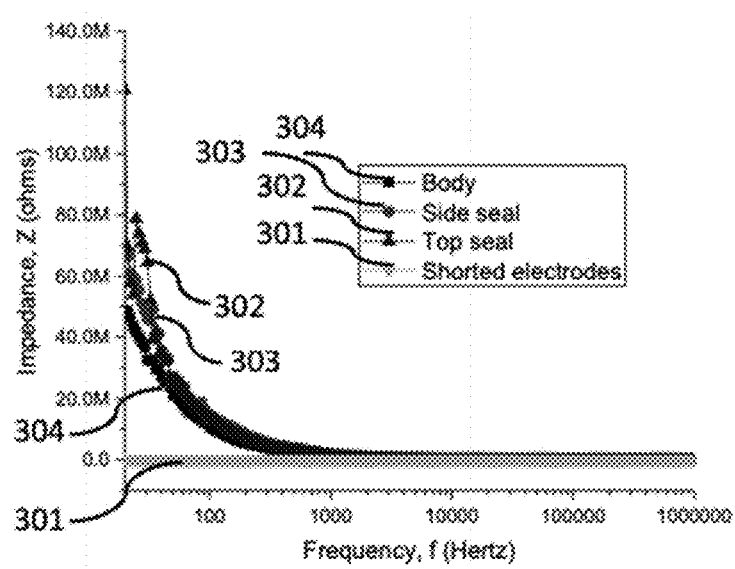
FIG. 3a) shows the measured impedance (in Ohms) vs. frequency (in Hertz) for the shorted electrodes, the top seal, the side seal and the body of the sachet, according to an example embodiment.
Figure 3B:
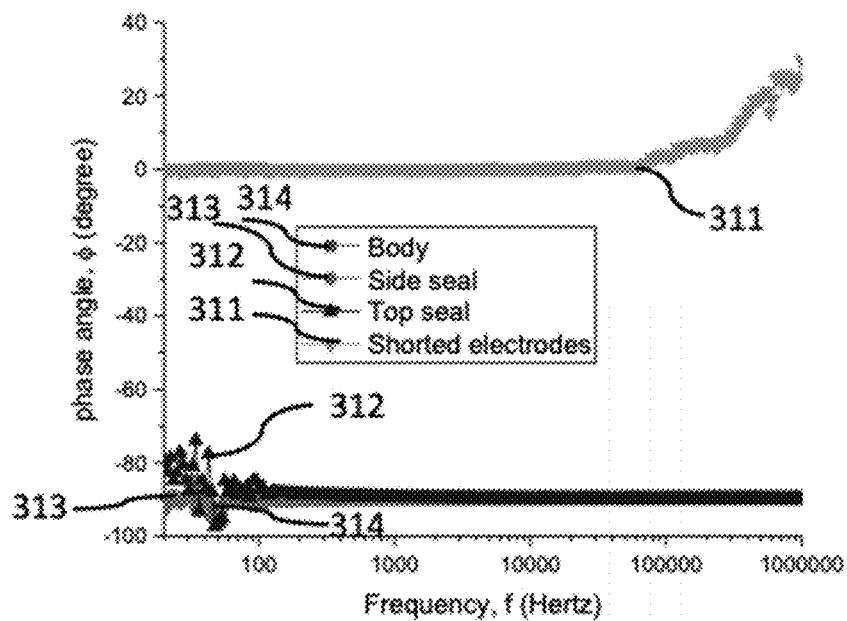
FIG. 3b) shows the measured phase (in degrees) vs. frequency (in Hertz) plots for the shorted electrodes, the top seal, the side seal and the body of the sachet, according to an example embodiment.
Figure 3C:
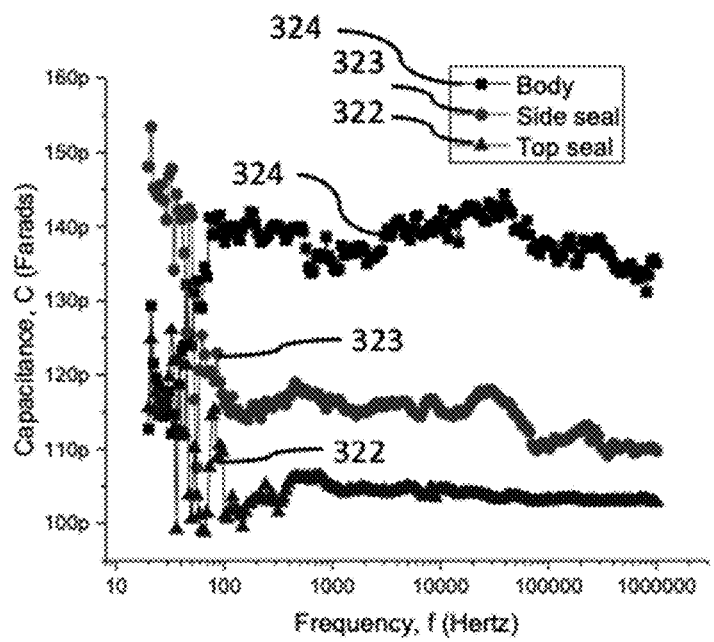
FIG. 3c) shows the resulting capacitance (in Farads) vs frequency (in Hertz) scans for the top seal, the side seal and the body of the sachet, according to an example embodiment.
Figure 3D:
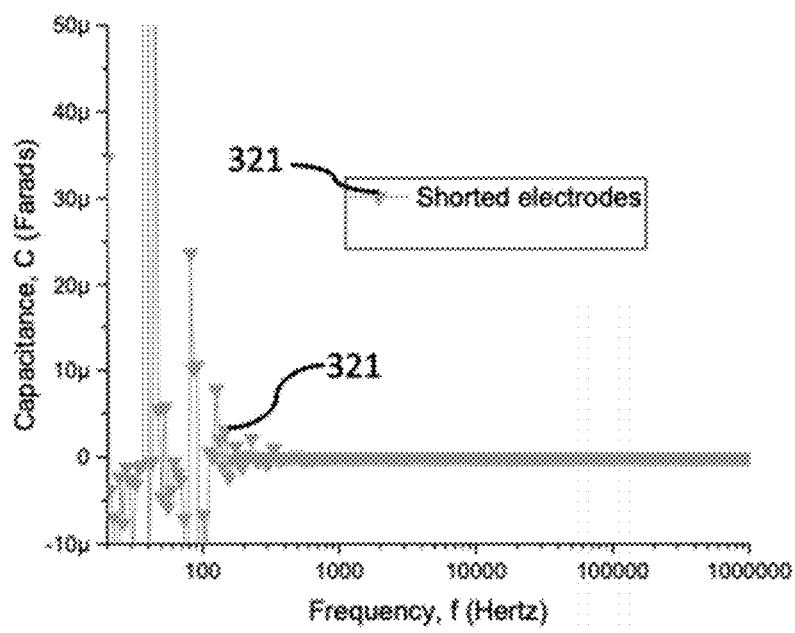
FIG. 3d) shows the resulting capacitance (in Farads) vs frequency (in Hertz) scan for the shorted electrodes, according to an example embodiment.

FIGS. 3a) to d) show experimental results of control experiments for shorted electrodes—both copper electrodes connected in short circuit—to ensure electrodes are working properly, sachet body, sachet side seal, and sachet top seal—to measure the baseline responses at different sealed areas and body of the sachet. More specifically, FIG. 3a) shows the measured impedance (in Ohms) vs. frequency (in Hertz) plots 301-304 for the shorted electrodes, the top seal, the side seal and the body of the sachet, respectively. FIG. 3b) shows the measured phase (in degrees) vs. frequency (in Hertz) plots 311-314 for the shorted electrodes, the top seal, the side seal and the body of the sachet, respectively. FIG. 3c) shows the resulting capacitance (in Farads) vs frequency (in Hertz) scans 322-324 for the top seal, the side seal and the body of the sachet, respectively, while FIG. 3d) shows the resulting capacitance (in Farads) vs frequency (in Hertz) scan 321 for the shorted electrodes.

iv) Side seal (with and without chocolate and malt powder particles placed in between the side seal opposing layers)—to test the effect of beverage particles on the capacitance response of the side seal, according to example embodiments.

Figure 4A:
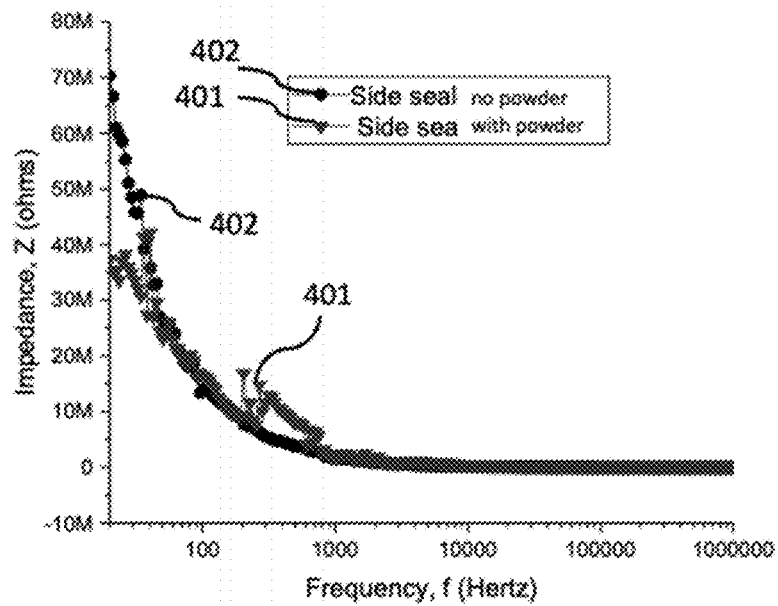
FIG. 4a) shows the measured impedance (in Ohms) vs. frequency (in Hertz) plots for the side seal with and without chocolate and malt powder particles, according to an example embodiment.
Figure 4B:
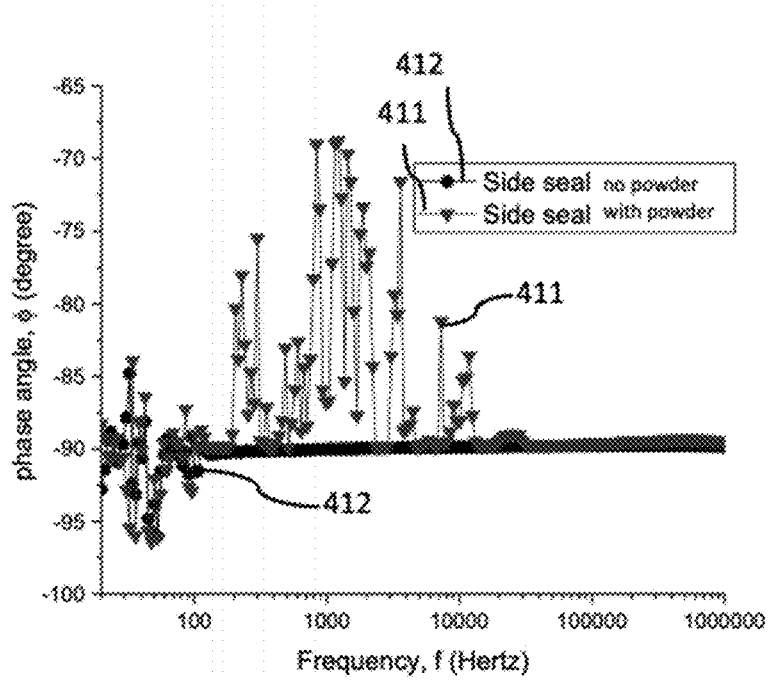
FIG. 4b) shows the measured phase (in degrees) vs. frequency (in Hertz) plots for the side seal with and without chocolate and malt powder particles, according to an example embodiment.
Figure 4C:
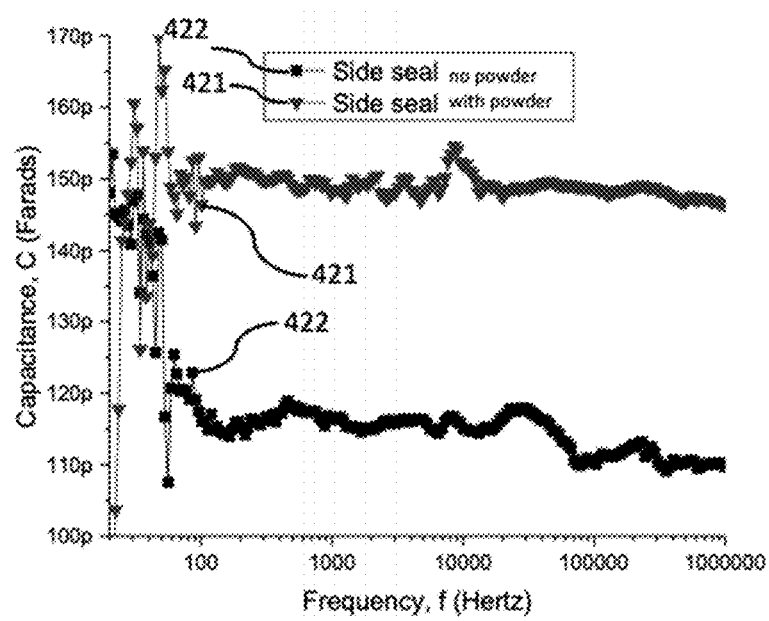
FIG. 4c) shows the resulting capacitance (in Farads) vs frequency (in Hertz) scans for the side seal with and without chocolate and malt powder particles, according to an example embodiment.

FIG. 4a) shows the measured impedance (in Ohms) vs. frequency (in Hertz) plots 401, 402 for the side seal with and without chocolate and malt powder particles, respectively. FIG. 4b) shows the measured phase (in degrees) vs. frequency (in Hertz) plots 411, 412 for the side seal with and without chocolate and malt powder particles, respectively. FIG. 4c) shows the resulting capacitance (in Farads) vs frequency (in Hertz) scans 421, 422 for the side seal with and without chocolate and malt powder particles, respectively.

As can be seen in the capacitance vs. frequency scans 421 (with chocolate and malt powder particles) and 422 (without chocolate and malt powder particles), the scans are readily distinguishable between the respective samples, advantageously enabling identification of poorly sealed samples.

v) Top seal (with and without chocolate and malt powder particles placed in between the top seal opposing layers)—to test the effect of beverage particles on the capacitance response of the top seal, according to example embodiments.

Figure 5A:
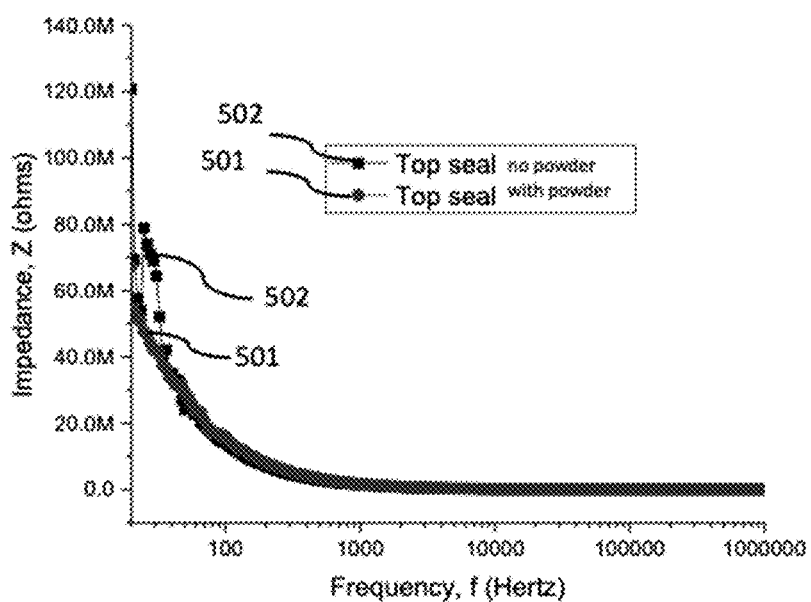
FIG. 5a) shows the measured impedance (in Ohms) vs. frequency (in Hertz) plots for the top seal with and without chocolate and malt powder particles, according to an example embodiment.
Figure 5B:
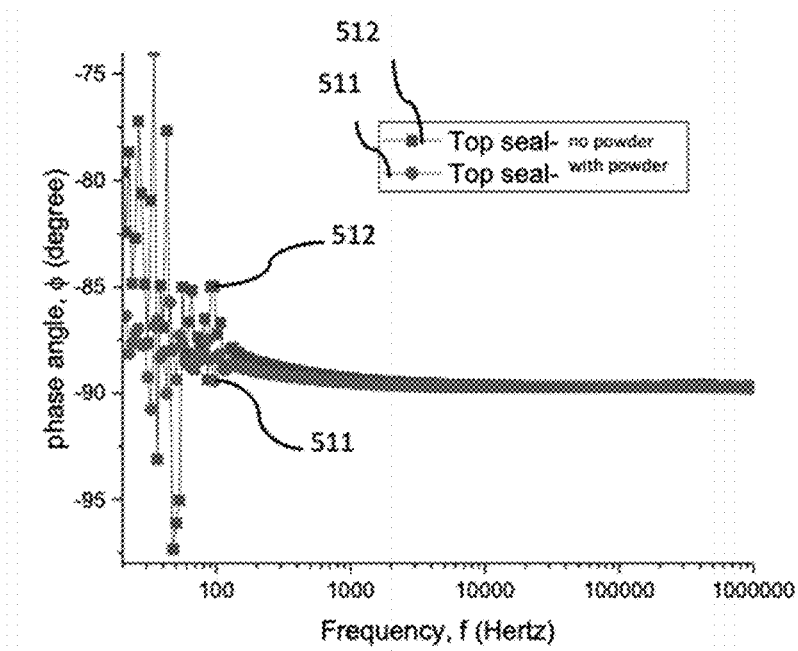
FIG. 5b) shows the measured phase (in degrees) vs. frequency (in Hertz) plots for the top seal with and without chocolate and malt powder particles, according to an example embodiment.
Figure 5C:
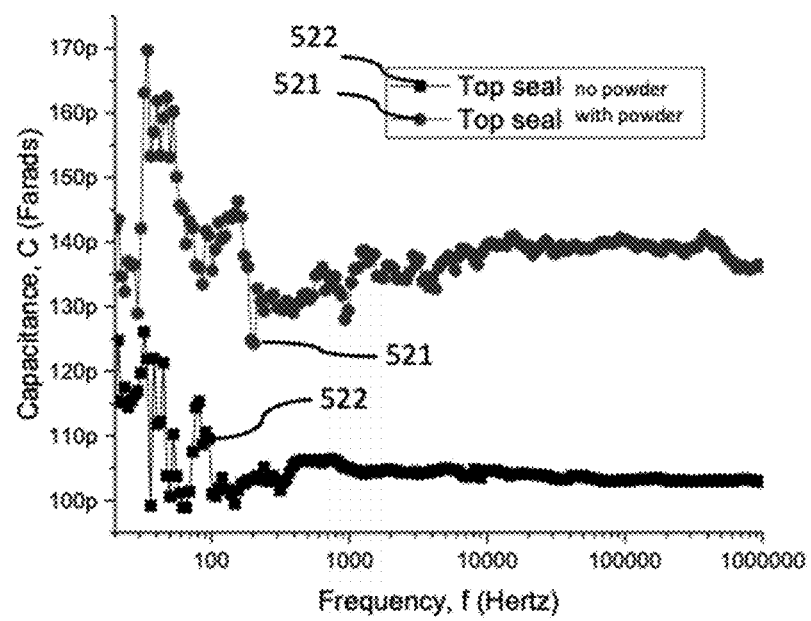
FIG. 5c) shows the resulting capacitance (in Farads) vs frequency (in Hertz) scans for the top seal with and without chocolate and malt powder particles, according to an example embodiment FIG. 6a) shows the measured impedance (in Ohms) vs. frequency (in Hertz) plots for the body with and without chocolate and malt powder particles, according to an example embodiment.

FIG. 5a) shows the measured impedance (in Ohms) vs. frequency (in Hertz) plots 501, 502 for the top seal with and without chocolate and malt powder particles, respectively. FIG. 5b) shows the measured phase (in degrees) vs. frequency (in Hertz) plots 511, 512 for the top seal with and without chocolate and malt powder particles, respectively. FIG. 5c) shows the resulting capacitance (in Farads) vs frequency (in Hertz) scans 521, 522 for the top seal with and without chocolate and malt powder particles, respectively.

As can be seen in the capacitance vs. frequency scans 521 (with chocolate and malt powder particles) and 522 (without chocolate and malt powder particles), the scans are readily distinguishable between the respective samples, advantageously enabling identification of poorly sealed samples.

vi) Body (with and without chocolate and malt powder particles placed in between the body opposing layers near the side seal)—to test the effect of beverage particles on the capacitance response of the body of sachets, according to example embodiments.

Figure 6A:
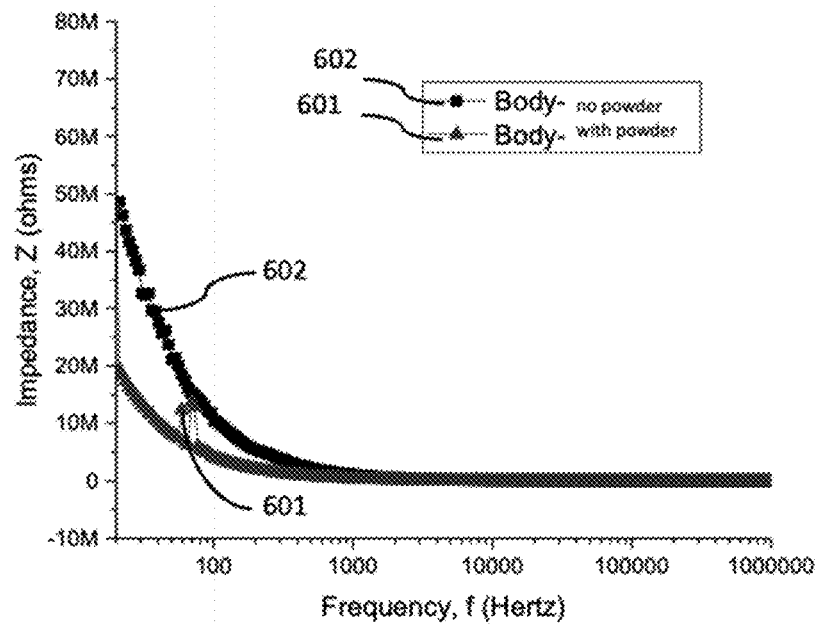
FIG. 6b) shows the measured phase (in degrees) vs. frequency (in Hertz) plots for the body with and without chocolate and malt powder particles, according to an example embodiment.
FIG. 6c) shows the resulting capacitance (in Farads) vs frequency (in Hertz) scans for the body with and without chocolate and malt powder particles, according to an example embodiment.
Figure 6B:
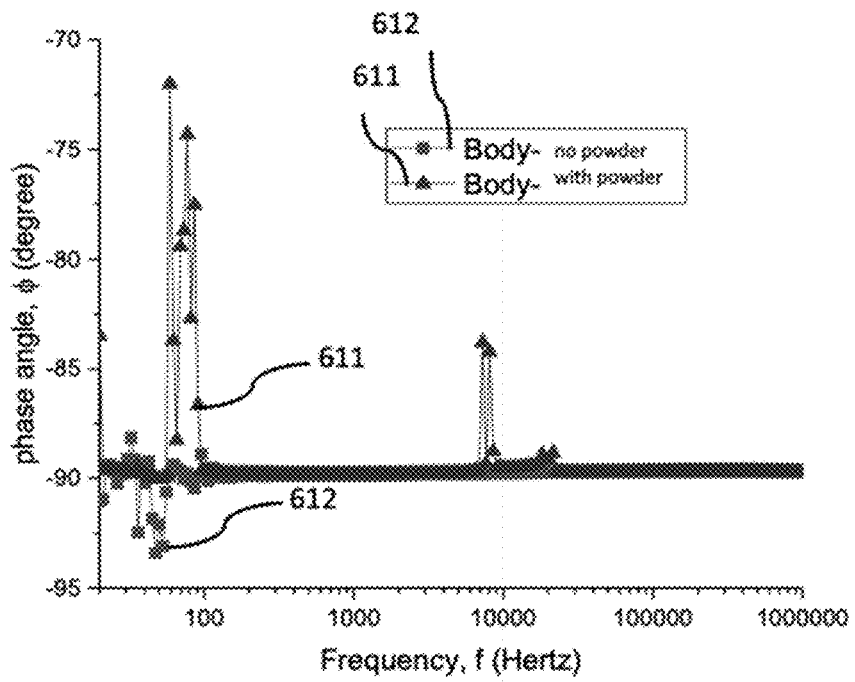
Figure 6C:
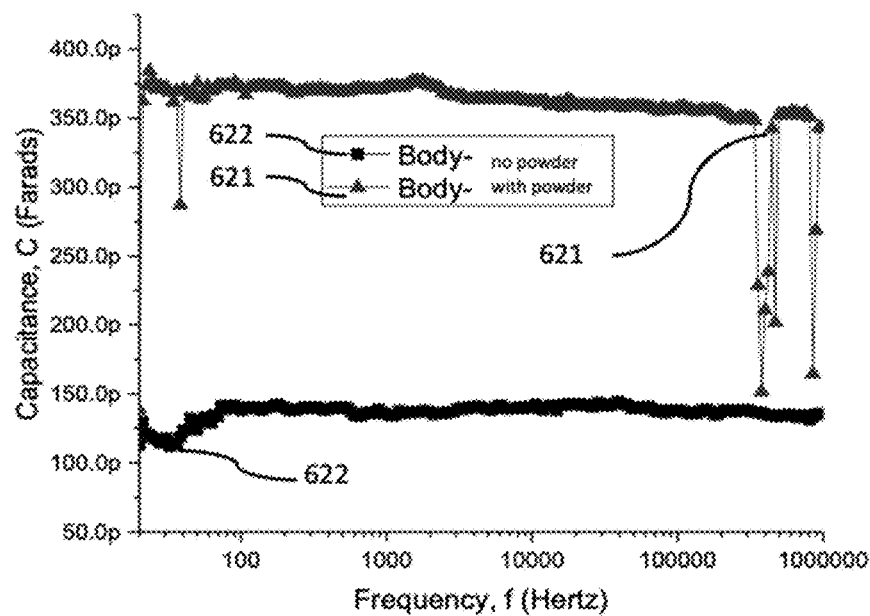

FIG. 6a) shows the measured impedance (in Ohms) vs. frequency (in Hertz) plots 601, 602 for the body with and without chocolate and malt powder particles, respectively. FIG. 6b) shows the measured phase (in degrees) vs. frequency (in Hertz) plots 611, 612 for the body with and without chocolate and malt powder particles, respectively. FIG. 6c) shows the resulting capacitance (in Farads) vs frequency (in Hertz) scans 621, 622 for the body with and without chocolate and malt powder particles, respectively.

As can be seen in the capacitance vs. frequency scans 621 (with chocolate and malt powder particles) and 622 (without chocolate and malt powder particles), the scans are readily distinguishable between the respective samples, advantageously enabling identification of presence of beverage particles in the sachet body.

vii) Control—Internal insulating cover removed and not removed from (single) sachet wall, to expose and not expose internal aluminum coating, respectively, with the (single) sachet wall sandwiched between the electrodes.

Figure 7A:
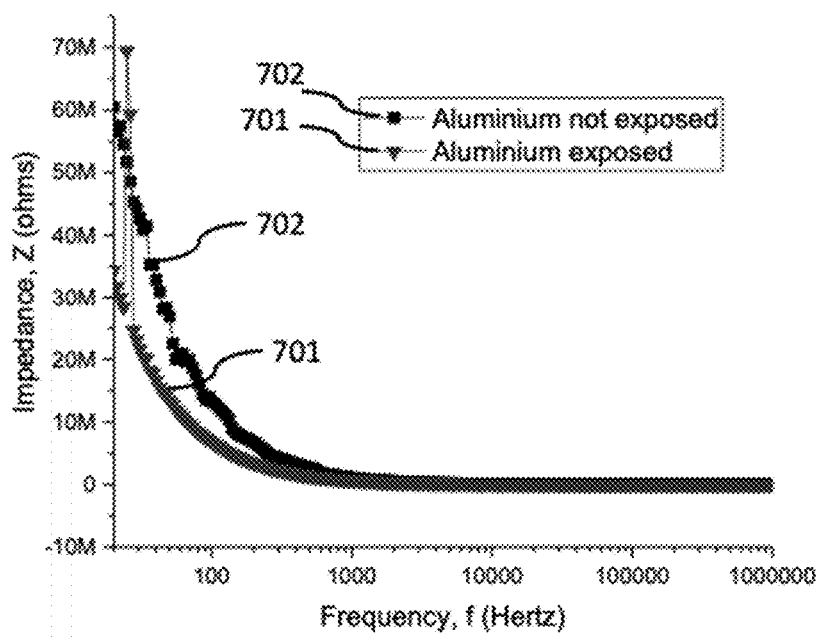
FIG. 7a) shows the measured impedance (in Ohms) vs. frequency (in Hertz) plots for the (single) sachet wall with the aluminum layer exposed and not exposed, according to an example embodiment.
Figure 7B:
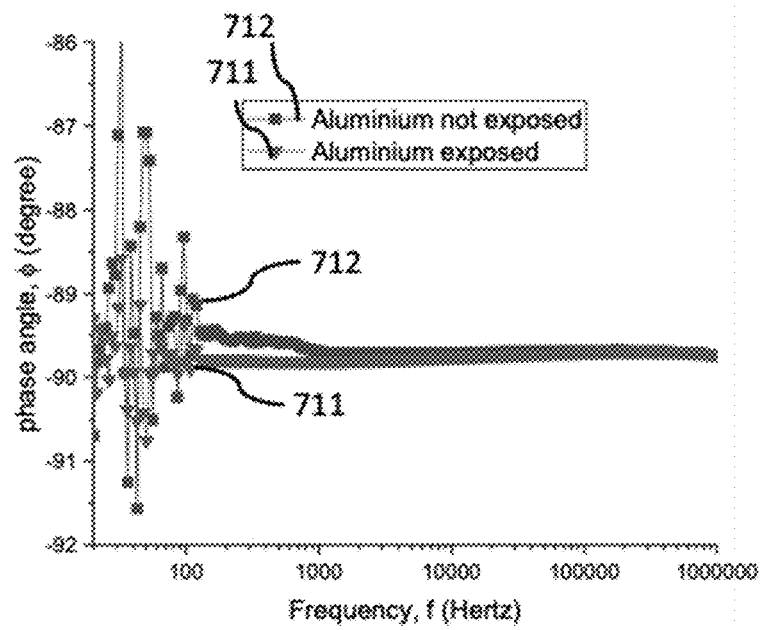
FIG. 7b) shows the measured phase (in degrees) vs. frequency (in Hertz) plots for the (single) sachet wall with the aluminum layer exposed and not exposed, according to an example embodiment.
Figure 7C:
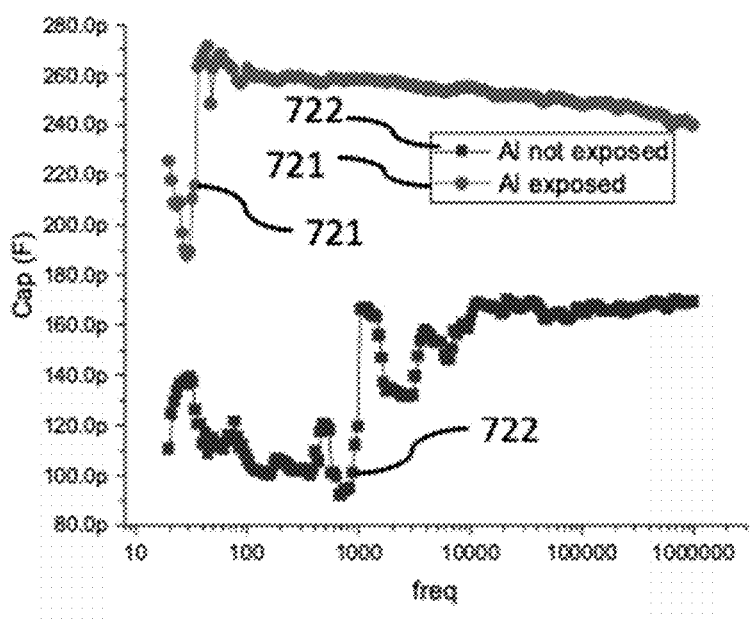
FIG. 7c) shows the resulting capacitance (in Farads) vs frequency (in Hertz) scans for the (single) sachet wall with the aluminum layer exposed and not exposed, according to an example embodiment FIG. 8a) shows the measured impedance (in Ohms) vs. frequency (in Hertz) plots for the exposed internal aluminum coating with and without chocolate and malt powder particles, according to an example embodiment.

FIG. 7a) shows the measured impedance (in Ohms) vs. frequency (in Hertz) plots 701, 702 for the (single) sachet wall with the aluminum layer exposed and not exposed, respectively. FIG. 7b) shows the measured phase (in degrees) vs. frequency (in Hertz) plots 711, 712 for the (single) sachet wall with the aluminum layer exposed and not exposed, respectively. FIG. 7c) shows the resulting capacitance (in Farads) vs frequency (in Hertz) scans 721, 722 for the (single) sachet wall with the aluminum layer exposed and not exposed, respectively.

viii) Internal aluminum coating exposed (with and without chocolate and malt powder particles between the opposing sachet walls)—to test the effect of beverage particles on the capacitance response with compromised internal coating.

Figure 8A:
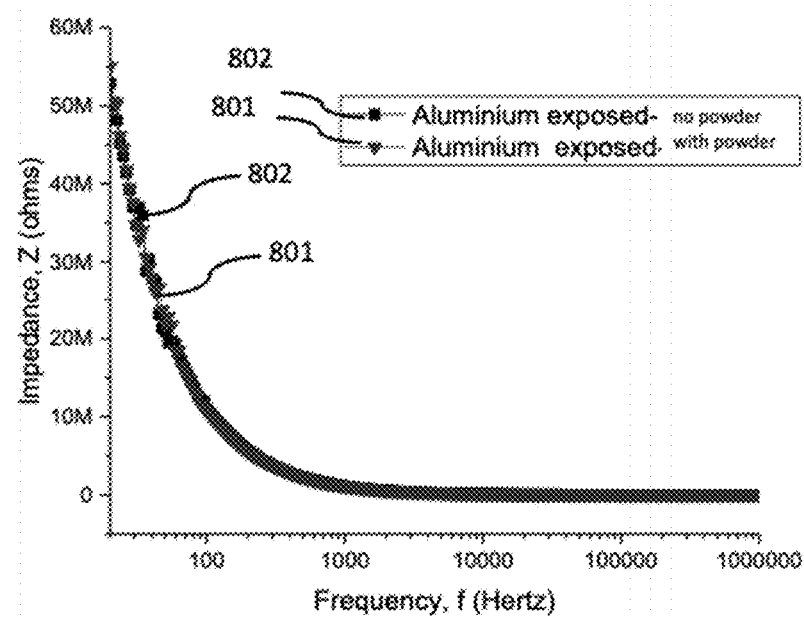
FIG. 8b) shows the measured phase (in degrees) vs. frequency (in Hertz) plots for the exposed internal aluminum coating with and without chocolate and malt powder particles, according to an example embodiment.
FIG. 8c) shows the resulting capacitance (in Farads) vs frequency (in Hertz) scans for the exposed internal aluminum coating with and without chocolate and malt powder particles, according to an example embodiment.
Figure 8B:
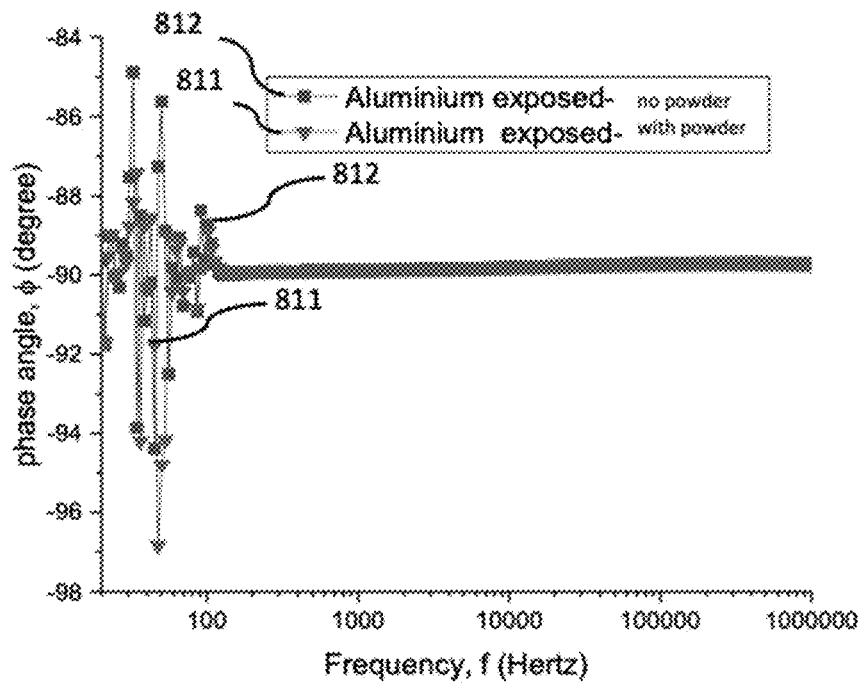
Figure 8C:
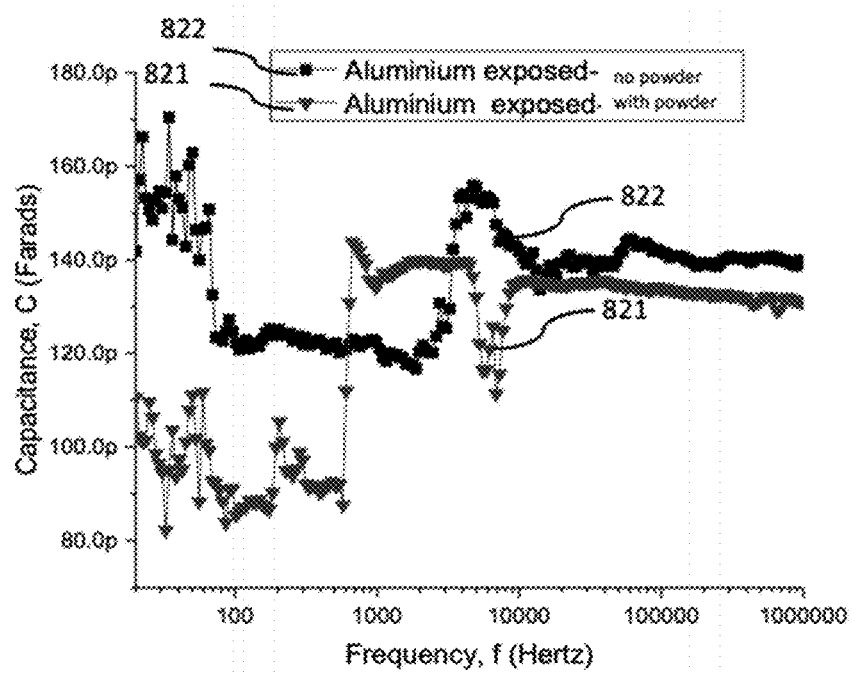

FIG. 8a) shows the measured impedance (in Ohms) vs. frequency (in Hertz) plots 801, 802 for the exposed internal aluminum coating with and without chocolate and malt powder particles, respectively. FIG. 8b) shows the measured phase (in degrees) vs. frequency (in Hertz) plots 811, 812 for the exposed internal aluminum coating with and without chocolate and malt powder particles, respectively. FIG. 8c) shows the resulting capacitance (in Farads) vs frequency (in Hertz) scans 821, 822 for the exposed internal aluminum coating with and without chocolate and malt powder particles, respectively.

As can be seen from the results described above, the observed increase in capacitance with chocolate and malt powder particles with no damage to internal insulating layer illustrates the ability of example embodiment to detect poor sealing (compare FIGS. 1, 4, 5 and 6).

The observed decrease in capacitance with chocolate and malt powder particles present when the internal insulating layer is damaged illustrates the ability of example embodiments to detect compromised insulation inside packets (compare FIG. 8).

ix) Plastic sachet seal (with and without fluid particles placed in between the seal opposing layers)—to test the effect of fluid contents as well as different type of sachet material (completely insulating, no metal) on the capacitance response of the sealed area, according to example embodiments.

Figure 9A:
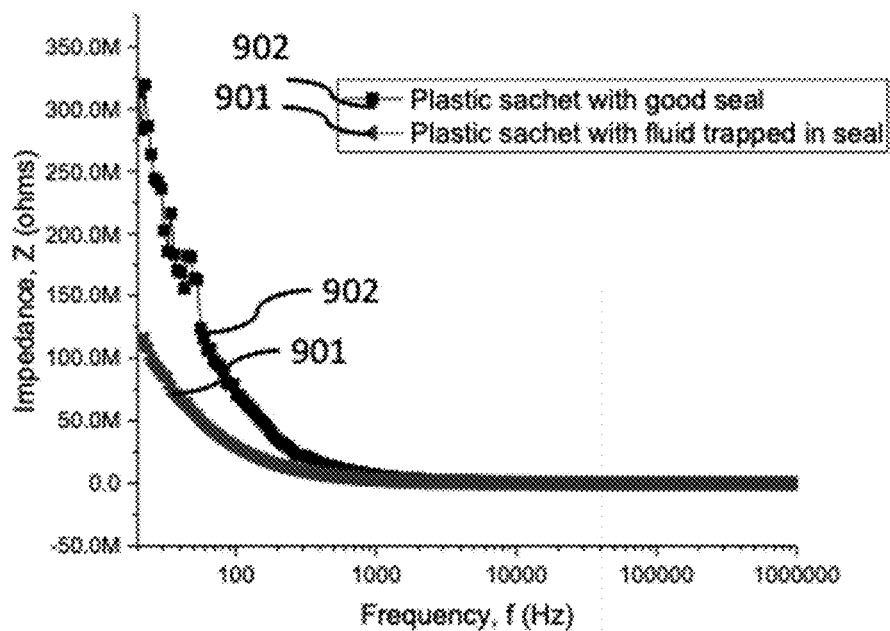
FIG. 9a) shows the measured impedance (in Ohms) vs. frequency (in Hertz) plots for the top plastic seal with and without fluid particles, according to an example embodiment.
Figure 9B:
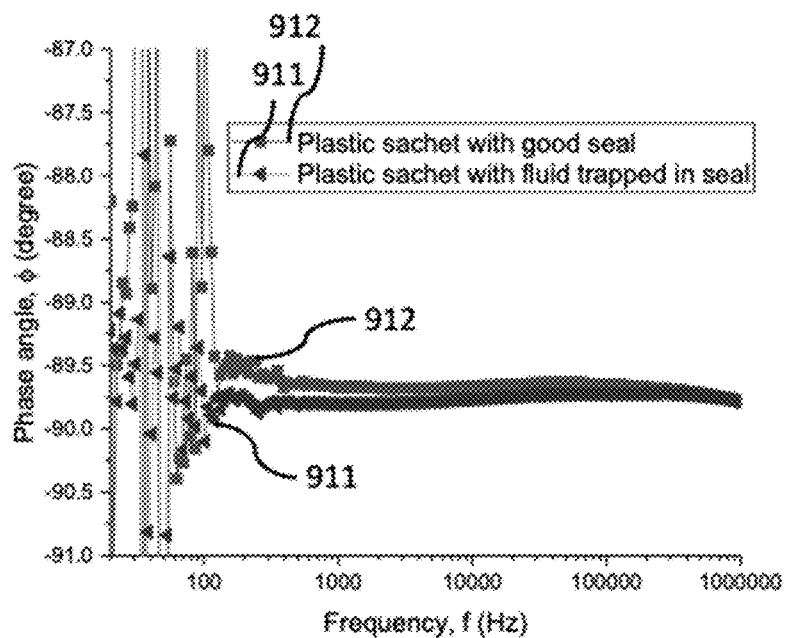
FIG. 9b) shows the measured phase (in degrees) vs. frequency (in Hertz) plots for the top plastic seal with and without fluid particles, according to an example embodiment.
Figure 9C:
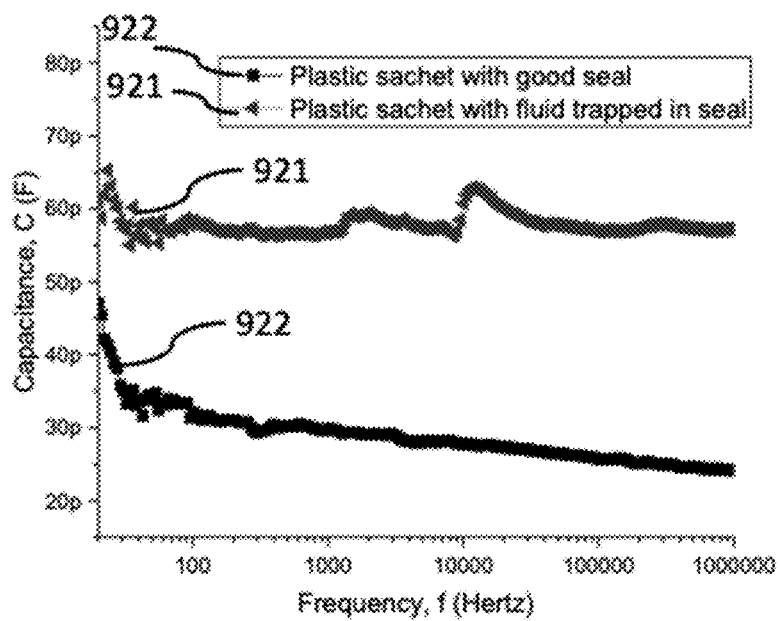
FIG. 9c) shows the resulting capacitance (in Farads) vs frequency (in Hertz) scans for the top plastic seal with and without fluid particles, according to an example embodiment.

FIG. 9a) shows the measured impedance (in Ohms) vs. frequency (in Hertz) plots 901, 902 for the top plastic seal with and without fluid particles, respectively. FIG. 9b) shows the measured phase (in degrees) vs. frequency (in Hertz) plots 911, 912 for the top plastic seal with and without fluid particles, respectively. FIG. 9c) shows the resulting capacitance (in Farads) vs frequency (in Hertz) scans 921, 922 for the top plastic seal with and without fluid particles, respectively.

It has been recognized by the inventors that a single frequency analysis gives only limited information in terms of change in an electrical parameter, for example, capacitance, for integrity testing of sachets without revealing much on the nature and cause of the defect. On the contrary, a frequency range analysis, preferably a wide frequency range analysis from about 3 kHz-300 GHz (or one or more sub-ranges thereof) according to example embodiments of the present invention advantageously allows obtaining a complete electrical characterization of the sachet with its content by converting the complex impedance-frequency spectrum into simple circuit elements comprising of resistance (R), capacitance (C) and inductance (L), akin to a Randles circuit model for an electrochemical cell. Moreover, frequency range analysis according to example embodiments advantageously provides sufficient information for machine learning needed to obtain electrical fingerprints of sachets to not only identify defective samples, but also preferably quantify and provide information on the type and location of defect.

For example, a highly complex mixture (containing solid and liquid components of different nature and sizes) inside a sachet would yield a complex frequency response according to example embodiments because it may contain conductive and/or insulating solid/liquid food particles, which may be partially/fully agglomerated/dispersed. These particles will respond at different frequencies and hence a particular locked frequency may not be able to scan the contents effectively. Another possible example for advantages of the multi-frequency application according to example embodiments is a compromised inner insulation coating in a sachet. This is seen e.g. in FIG. 8c), wherein, the absence of an insulating layer on one side of the packet leads to an asymmetric package layer removal of an insulating component, causing a change in the overall nature of the sachet sandwiched between the electrodes, which is reflected in terms of significant capacitance change at lower frequencies compared to higher frequencies.

Example Industrial Applications of Example Embodiments

Beverage powder manufacturers fill sachets at high speed and seal at high temperature. During this process, they suffer from spillage of particles onto the seal area resulting in defective seals, which subsequently affects sample quality and lead to huge waste causing huge financial losses. These applications can be expanded to other products including liquid sachets and cosmetic packets as well.

Embodiments of the present invention can provide a capacitance based screening approach to detect such improper seals even with tiny trapped particles at a rapid rate online, thereby increasing the throughput during packaging and reducing wastage. The differential capacitance can also be extended to detect leaks and defective inner coatings of flexible sachets.

Embodiments of the present invention can be extended for non-contact mode of inspection of defective seals, contents and inner coatings by designing electrode/electrode array compatible with radio frequency (3 kHz to 300 GHz) operation, which create a stronger fringing electric field and thus eliminates the need to for contact mode inspection.

Modifications of Example Embodiments

Figures 10A, 10B:
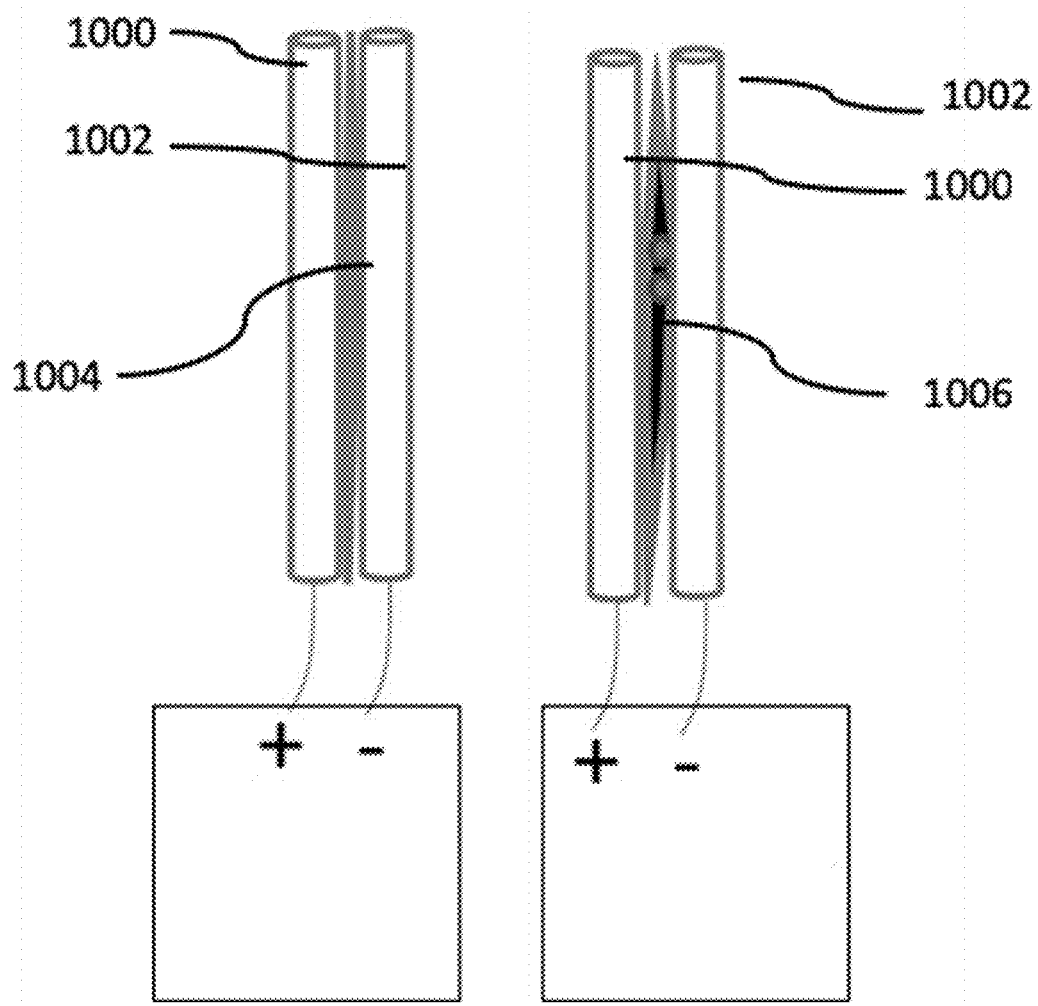
FIG. 10a) shows a schematic diagram of roller electrodes on a well-sealed sachet, according to an example embodiment.
FIG. 10b) shows a schematic diagram of roller electrodes on a poorly sealed sachet, according, to an example embodiment.

To obtain a detailed electrical spectrum of sachet across the whole area to electrically profile defects in terms of quantity, type and location without compromising on the throughput, example embodiments can be modified to use rollers 1000, 1002 for the capacitance measurements electrodes, which can conform to the sachets 1004 (well-sealed) and 1006 (poorly-sealed) shape, as shown in FIGS. 10a) and b) respectively, to scan the entire package in-line.

As the sealed sachets traverse through the roller electrodes, an electrical profile of the sachet (plus contents) can be obtained by integration of the electrical parameters measured at each point contact across the whole sachet area. At the same time, the electrical parameters measured at each point contact serve as differential components capable of identifying the location of defects. Furthermore, these can reveal information about the type of defects (seal trapped particle or worn out body insulation), defect location (seal or body) and quantify them (amount of trapped particles) by comparing against control standards (good sachets). Such electrical signatures according to example embodiments advantageously serve as fingerprint patterns, which when fed to a machine learning system can quantitatively and qualitatively identify and classify defects, according to example embodiments.

Accordingly, to address that different amount and nature of particles are expected to amount to different capacitance signatures leading to a multi-dimensional data that may make comprehension of data analysis more challenging, example embodiments can be modified to use a machine learning approach to cluster and fingerprint capacitance signatures based on particle size and type.

While capacitance vs. frequency has been described above as the primary "signature" for characterization, the electrical variable is not restricted to capacitance, but may be seen as resistance, phase and impedance change at different frequencies depending on the nature of sample and its contents in different embodiments. The use of wide range of frequencies according to example embodiments advantageously allows examination of different types of packages and their contents (conductive and insulating) containing both solid/fluid particles in both body as well as seal area for characterizing defective seals and poor inner coatings.

The proposed inspection system has a wide range of use in terms of sachet contents (including fluid) and sachet material (insulating or conducting). For example, a complete plastic sachet with no metallic components with fluid contents trapped in the seal was clearly distinguished by changes in capacitance, impedance and phase (see FIG. 9 described above). This confirms that the embodiments of the present invention can be extended to fluid contents as well as different types of sachet materials.

Figure 11:
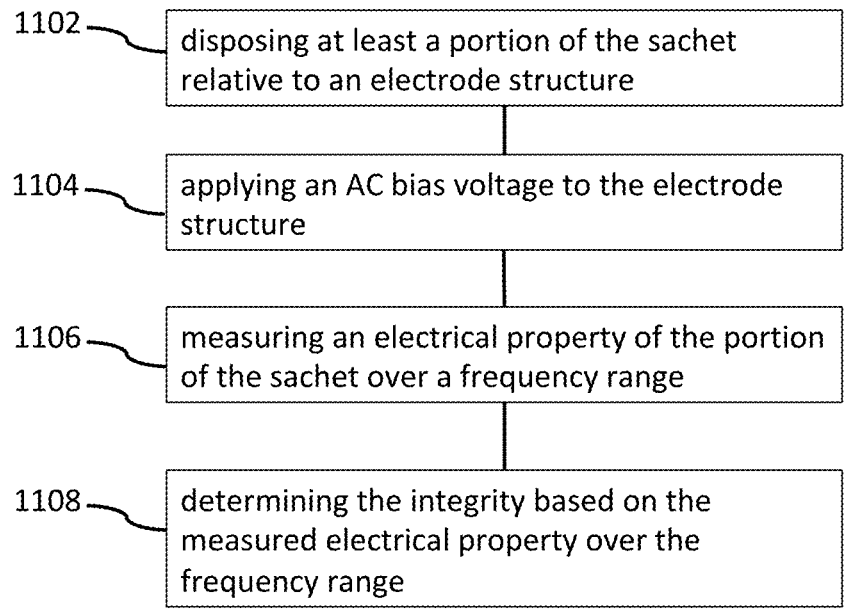
FIG. 11 shows a flow-chart illustrating a method for integrity testing of sachets according to an example embodiment.

FIG. 11 shows a flow-chart 1100 illustrating a method for integrity testing of sachets according to an example embodiment. At step 1102, at least a portion of the sachet is disposed relative to an electrode structure. At step 1104, an AC bias voltage is applied to the electrode structure. At step 1106, an electrical property of the portion of the sachet is measured over a frequency range. At step 1108, the integrity is determined based on the measured electrical property over the frequency range.

The electrical property may comprise one or more of a group consisting of capacitance, resistance, phase and impedance.

The portion of the sachet may comprise a seal portion and the integrity may be determined based on identifying trapped particles in the seal portion based on the measured electrical property of the seal portion over the frequency range.

The portion of the sachet may comprise a body portion and the integrity may be determined based on identifying removal of an internal protective coating of the sachet based on the measured electrical property of the body portion over the frequency range. The integrity may be tested with or without particles inside the sachet at the body portion.

The electrode structure may comprise a single electrode, a double electrode, or an electrode array operated within 10 Hz-1 MHz. The operation range of the single electrode, double electrode or electrode array may be extended to include the radio frequency range, e.g. about 3 kHz-300 GHz as well. The single electrode, double electrode or electrode array may be used in non-contact mode, e.g. when operated at radio frequency range. The electrode structure may comprise one or more of a group consisting of planar, circular, ring, and roller electrodes.

The electrode structure may comprise opposing electrodes, and the portion of the sachet may be disposed between the opposing electrodes.

Determining the integrity may comprises applying a machine learning approach.

Figure 12:
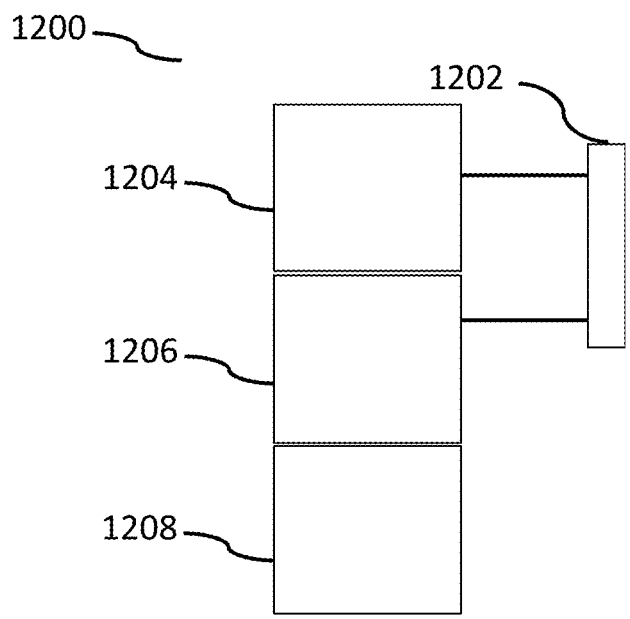
FIG. 12 shows a schematic drawing illustrating a system for integrity testing of sachets, according to an example embodiment.

FIG. 12 shows a schematic drawing illustrating a system 1200 for integrity testing of sachets, according to an example embodiment. The system 1200 comprises an electrode structure 1202 configured to be disposed relative to at least a portion of a sachet, a source 1204 configured to apply an AC bias voltage to the electrode structure 1202, a measurement unit 1206 configured to measure an electrical property of the portion of the sachet over a frequency range, and a determination unit 1208 configured to determine the integrity based on the measured electrical property over the frequency range.

The electrical property may comprise one or more of a group consisting of capacitance, resistance, phase and impedance.

The portion of the sachet may comprise a seal portion and the determination unit 1208 may be configured to determine the integrity based on identifying trapped particles in the seal portion based on the measured electrical property of the seal portion over the frequency range.

The portion of the sachet may comprise a body portion and the determination unit 1208 may be configured to determine the integrity based on identifying removal of an internal protective coating of the sachet based on the measured electrical property of the body portion over the frequency range. The determination unit 1208 may be configured to determine the integrity with or without particles inside the sachet at the body portion.

The electrode structure 1202 may comprise a single electrode, a double electrode, or an electrode array. The single electrode, double electrode or electrode array may be configured to operate at radio frequency range, e.g. about 3 kHz-300 GHz. The single electrode, double electrode or electrode array may be configured to be used in non-contact mode, e.g. at radio frequency range. The electrode structure 1202 may comprise one or more of a group consisting of planar, circular, ring, and roller electrodes.

The electrode structure 1202 may comprise opposing electrodes, and the portion of the sachet is disposed between the opposing electrodes.

The determination unit 1208 may be configured to apply a machine learning approach.

The determination unit 1208 may comprise a display and/or a processing unit.

Example embodiment of the present invention can have one or more of the following advantages:
 i. Capacitance based screening according to example embodiments is highly sensitive to even small particles, which can eliminate poorly sealed sachets by preventing contamination and increasing protect product shelf life.
 ii. The sensors according to example embodiments can operate in real-time for rapid detection of compromised seals/inner protective layers, which can reduce processing/packaging time by enabling sealing/coating issues to be discovered and fixed immediately in production/packaging line.

In a typical high production assembly for sachets, the samples propagate in a conveyor system after being sealed. Using, for example, a system of roller electrodes according to an example embodiment in-line with the sealing system advantageously allows screening of the sealed sachets instantly without compromising on the throughput. Defective samples which are not compliant with the control sample capacitance (or other parameters) can be instantly guided into a sideway path to be re-packaged, while good samples pass through, thus advantageously eliminating the need for sample collection and offline sampling according to an example embodiment. This segregation can be further improved by integration with a machine learning system according to an example embodiment, which can identify the types of defect.

iii. Low power consumption and no requirement of high cost and heavy equipment in the capacitance based sensing according to example embodiments can provide real time integrity inspection of every single sachet on the packaging line—at the speed of the machine throughput iv. Simple mode of inspection according to example embodiments requires no sampling methods, minimizes waste (time, work-backs, materials and labor) and reduces waste disposal.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. A method for integrity testing of sachets, the method comprising the steps of:
   disposing at least a portion of the sachet relative to an electrode structure;
   applying an AC bias voltage to the electrode structure such that an electric field extends across a thickness of the portion of the sachet;
   measuring an electrical property across the thickness of the portion of the sachet over a frequency range, and
   determining the integrity based on the measured electrical property over the frequency range,
   wherein the frequency range allows for inner insulation coating defects in the sachets to be identified.

2. The method of claim 1, wherein the electrical property comprises
   one or more of a group consisting of capacitance, resistance, phase and impedance.

3. The method of claim 1, wherein the portion of the sachet comprises a seal portion and the integrity is determined based on identifying trapped particles in the seal portion based on the measured electrical property of the seal portion over the frequency range.

4. The method of claim 1, wherein the portion of the sachet comprises a body portion and the integrity is determined based on identifying removal of an internal protective coating of the sachet based on the measured electrical property of the body portion over the frequency range.

5. The method of claim 4, wherein the integrity is tested with or without particles inside the sachet at the body portion.

6. The method of claim 1, wherein the electrode structure comprises a single electrode, a double electrode, or an electrode array, and optionally the single electrode, double electrode or electrode array are operated at radio frequency range.

7. The method of claim 6, wherein the single electrode, double electrode or electrode array is used in non-contact mode.

8. The method of claim 6, wherein the electrode structure comprises one or more of a group consisting of planar, circular, ring, and roller electrodes.

9. The method of claim 1, wherein the electrode structure comprises opposing electrodes, and the portion of the sachet is disposed between the opposing electrodes, and/or optionally wherein determining the integrity comprises applying a machine learning approach.

10. A system for integrity testing of sachets, the system comprising:
    an electrode structure configured to be disposed relative to at least a portion of a sachet;
    a source configured to apply an AC bias voltage to the electrode structure such that an electric field extends across a thickness of the portion of the sachet;
    a measurement unit incorporating first hardware or a first combination of software with hardware and configured to measure an electrical property across the thickness of the portion of the sachet over a frequency range; and
    a determination unit incorporating second hardware or a second combination of software with hardware and configured to determine the integrity based on the measured electrical property over the frequency range, wherein the frequency range allows for inner insulation coating defects in the sachets to be identified.

11. The system of claim 10, wherein the electrical property comprises one or more of a group consisting of capacitance, resistance, phase and impedance.

12. The system of claim 10, wherein the portion of the sachet comprises a seal portion and the determination unit is configured to determine the integrity based on identifying trapped particles in the seal portion based on the measured electrical property of the seal portion over the frequency range.

13. The system of claim 10, wherein the portion of the sachet comprises a body portion and the determination unit is configured to determine the integrity based on identifying removal of an internal protective coating of the sachet based on the measured electrical property of the body portion over the frequency range.

14. The system of claim 13, wherein the determination unit is configured to determine the integrity with or without particles inside the sachet at the body portion.

15. The system of claim 10, wherein the electrode structure comprises a single electrode, a double electrode, or an electrode array, and optionally the single electrode, double electrode or electrode array is configured to operate at radio frequency range.

16. The system of claim 15, wherein the single electrode, double electrode or electrode array is configured to be used in non-contact mode.

17. The system of claim 15, wherein the electrode structure comprises one or more of a group consisting of planar, circular, ring, and roller electrodes.

18. The system of claim 10, wherein the electrode structure comprises opposing electrodes, and the portion of the sachet is disposed between the opposing electrodes, and/or optionally wherein the determination unit is configured to apply a machine learning approach.

19. The system of claim 10, wherein the determination unit comprises a display and/or a processing unit.

20. The method of claim 1,
wherein the frequency range comprises a frequency range from 20 Hz to 1 MHz.

* * * * *